(12) United States Patent
Ko (10) Patent No.: US 7,437,259 B2
(45) Date of Patent: Oct. 14, 2008

(54) PARAMETER CALIBRATING APPARATUS AND METHOD FOR A CONTROLLER

(75) Inventor: Yu-Cheng Ko, Guangdong (CN)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 0 days.

(21) Appl. No.: 11/616,290

(22) Filed: Dec. 27, 2006

(65) Prior Publication Data
US 2007/0239392 A1 Oct. 11, 2007

(30) Foreign Application Priority Data
Apr. 7, 2006 (CN) ......................... 2006 1 0060222

(51) Int. Cl.
*G06F 19/00* (2006.01)
*G01R 35/00* (2006.01)
(52) U.S. Cl. ........................... 702/106; 702/85; 702/189
(58) Field of Classification Search ................... 702/85, 702/106, 124, 189; 324/601–603, 606, 615, 324/520, 681, 707; 700/12, 28, 37; 340/511, 340/514
See application file for complete search history.

(56) References Cited
U.S. PATENT DOCUMENTS
4,189,778 A * 2/1980 Vogel ........................... 702/63

| | | | | |
|---|---|---|---|---|
| 4,949,029 A * | 8/1990 | Cooper et al. | ................. | 324/74 |
| 6,624,411 B2 * | 9/2003 | Umemura | .................... | 250/292 |
| 6,973,535 B2 * | 12/2005 | Bruner et al. | ................ | 711/112 |
| 2005/0200365 A1 * | 9/2005 | Bradley et al. | .............. | 324/601 |
| 2007/0156363 A1 * | 7/2007 | Stewart et al. | .............. | 702/113 |

OTHER PUBLICATIONS

Sergio Bittanti, Fabio Dell'Orto, Andrea Di Carlo, Sergio M, Savaresi, "Radial Tracking in High-Speed DVD Players (an application of notch filtering and multirate control)", Proceedings of the 40th IEEE conference on Decision and Control, Orlando, Florida USA, Dec. 2001.
Sergio Bittanti, Fabio Dell'Orto, Andrea Di Carlo, Sergio M. Savaresi, "Notch Filtering and Multirate Control for Radial Tracking in High-Speed DVD-Players", IEEE Transactions on Consumer Electronics, vol. 48, No. 1, Feb. 2002.

* cited by examiner

*Primary Examiner*—Edward Raymond
*Assistant Examiner*—Elias Desta
(74) *Attorney, Agent, or Firm*—Winston Hsu (57) ABSTRACT

A controller of an optical disk device includes: a first sub-controller, a second sub-controller and a third sub-controller. The first sub-controller includes serially connected a first lead-lag filter and a first low pass filter. The second sub-controller includes a second lead-lag filter and a second low pass filter that are serially connected. The third sub-controller includes serially connected a second lead-lag filter, a third low pass filter and a extra lead-lag filter. A parameter calibrating apparatus and method for the controller is also disclosed.

17 Claims, 11 Drawing Sheets

(Related Art)

FIG. 11
(RELATED ART)

PARAMETER CALIBRATING APPARATUS AND METHOD FOR A CONTROLLER

BACKGROUND OF THE INVENTION

1. Field of the Invention

The present invention generally relates to a parameter calibrating apparatus and method for a controller. In particular, the present invention relates to a controller of an optical disk device and a parameter calibrating apparatus and a parameter calibrating method for the controller.

2. Description of Related Art

In recent years, optical disks have been extensively developed as means for storing a large amount of data. Optical disk devices use laser beams for recording data to or reproducing data from the optical disks.

Figure 10:
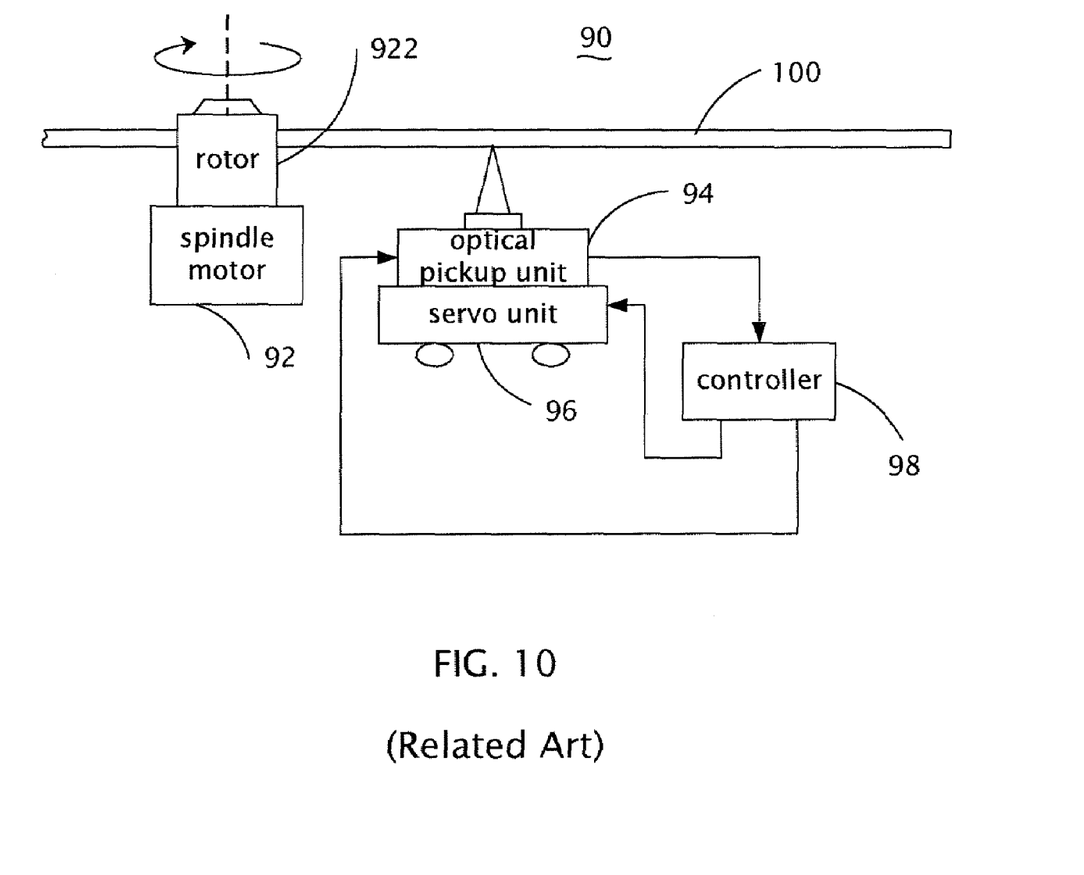
FIG. 10 is a schematic view of an optical disk device.

Referring to FIG. 10, a schematic diagram of an optical disk device is shown. Generally, the optical disk device 90 includes a spindle motor 92, an optical pickup unit 94, a servo unit 96, and a controller 98.

The spindle motor 92 has a rotor 922 on which an optical disk 100 may be placed, and is used for driving the optical disk 100 to rotate around an axis of the rotor 922. The optical pickup unit 94 is configured for emitting a laser beam to the optical disk 100, receiving a return laser beam reflected from the optical disk 100, and converting the return laser beam into electric signals. The electric signals may include data-signals containing data recorded on the optical disk 100, and servo error signals of the optical pickup unit 94. The controller 98 receives the electric signals from the optical pickup unit 94, and generates servo adjusting signals based on the servo error signals. The servo adjusting signals are transmitted to the optical pickup unit 94 and the servo unit 96, for performing focusing and/or tracking to eliminate or decrease focus and/or tracking error between the optical pickup unit 94 and the optical disk 100.

Figure 11:
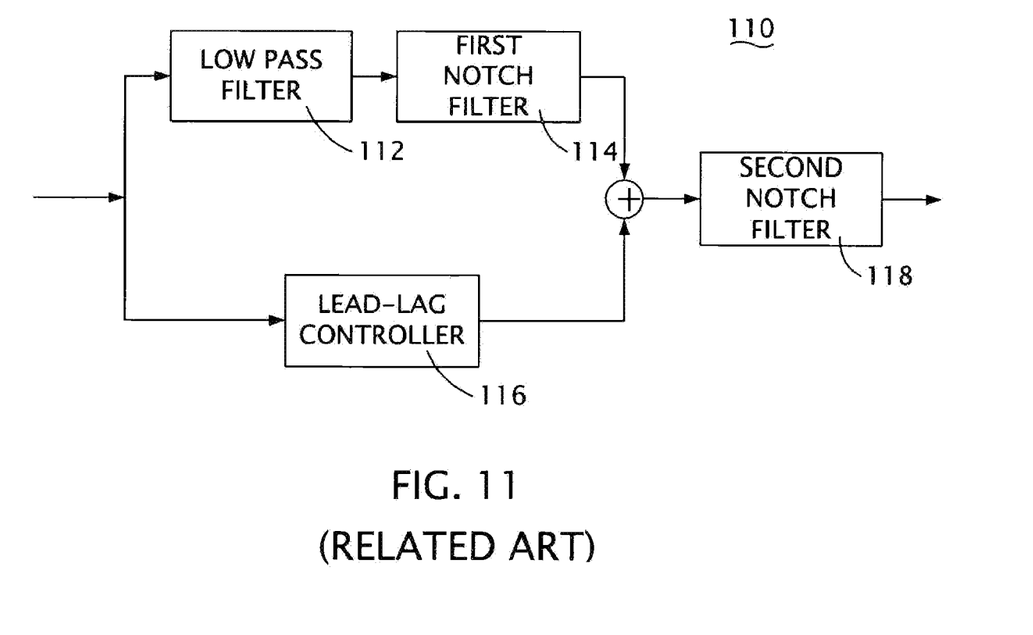
FIG. 11 is a schematic diagram of a conventional controller for an optical disk device.

Referring now to FIG. 11, a block diagram illustrating an example of a controller used in an optical disk device is shown. The controller 110 includes a low pass filter 112, a first notch filter 114, a lead-lag controller 116, and a second notch filter 118. The low pass filter 112 is used for depressing high frequency components of inputted signals, and thus reducing control efforts caused by the high frequency components. The first notch filter 114 is collocated at a corresponding rotation frequency of a given optical disk, in order to give a large local gain at the rotation frequency. The lead-lag controller 116 is used for filtering at a relative low frequency and maintaining a stable filtering loop. The second notch filter 118 is in correspondence with a resonance frequency of a given optical pickup unit and servo unit. See, for example, Sergio Bittanti, Fabio Dell'Orto et al., "RADIAL TRACKING IN HIGH-SPEED DVD PLAYERS (an application of notch filtering and multirate control)", *Proceedings of the 40th IEEE conference on Decision and Control*, Orlando, Fla. USA, December 2001.

However, it fails to give an example of an apparatus for calibrating parameters of the controller 98 when the controller 98 is utilized with a controlled plant, such as an optical pickup, and a tracking servo unit. Whereas, due to different characteristics of the controlled plant, parameters of the controller should be calibrated to generate controlling signals accurately. Otherwise the controller could not be able to be adaptable with different controlled plants. Therefore, a need exists in the industry for an apparatus for calibrating controller parameters for different controlled plants of different optical disk devices.

SUMMARY OF THE INVENTION

A parameter calibrating apparatus for calibrating parameter setting of a controller includes a frequency setting input unit, a controller signal input unit, a frequency calculating unit, a calculator, a comparator, and a signal generator. The frequency setting input unit is used for inputting a setting for a testing signal. The controller signal input unit is used for inputting controller signals obtained from nodes of the controller. The frequency calculating unit is used for calculating a generating frequency of the testing signals. The calculator is used for calculating gain results based on the received controller signals. The comparator is used for comparing the gain results with a predetermined threshold. The signal generator is used for generating the testing signal according to the generating frequency calculated by the frequency calculating unit.

A parameter calibrating method for calibrating parameter setting of a controller includes the following steps of: setting initial parameters for the controller; choosing nodes from the controller; receiving testing signal settings; generating testing signals according to the testing signal settings; receiving monitoring signals from the nodes; calculating gain results according to the monitoring signals; and comparing the gain results with predetermined threshold values.

A controller of an optical disk device includes a first sub-controller, a second sub-controller and a third sub-controller. The first sub-controller is used for receiving an inputted signal from a plant. The first sub-controller includes a first lead-lag filter and a first low pass filter in serial connection with the first lead-lag filter. The first lead-lag filter is used for filtering the inputted signal with a first phase lock loop to generate a first lead-lag filtered signal. The first low pass filter is used for passing low-frequency components in the first lead-lag filtered signal. The second sub-controller is used for receiving an outputted signal from the first sub-controller. The second sub-controller includes a second lead-lag filter and a second low pass filter in serial connection with the second lead-lag filter. The second lead-lag filter is used for filtering the outputted signal from the first sub-controller with a second phase lock loop to generate a second lead-lag filtered signal. The second low pass filter is used for passing low-frequency components in the second lead-lag filtered signal. The third sub-controller is used for receiving an inputted signal from a plant. The third sub-controller includes sequentially connected a third lead-lag filter, a third low pass filter, and an extra lead-lag filter. The third lead-lag filter is used for filtering the inputted signal with a third phase lock loop to generate a third lead-lag filtered signal. The third low pass filter is used for passing low-frequency components in the third lead-lag filtered signal to generate a third low-pass filtered signal. And the extra lead-lag filter is used for filtering the third low-pass filtered signal with an extra phase lock loop.

Other systems, methods, features, and advantages of present parameters calibrating system and method and the present controller will be or become apparent to one with skill in the art upon examination of the following drawings and detailed description. It is intended that all such additional systems, methods, features, and advantages be included within this description, be within the scope of the present system and method, and be protected by the accompanying claims.

BRIEF DESCRIPTION OF THE DRAWINGS

Many aspects of the present parameter calibrating apparatus and method and the present controller can be better understood with reference to the following drawings. The components in the drawings are not necessarily to scale, emphasis instead being placed upon clearly illustrating the principles of the present system and method. Moreover, in the drawings, like reference numerals designate corresponding parts throughout the several views.

DETAILED DESCRIPTION OF THE INVENTION

Reference will now be made to the drawings to describe a preferred embodiment of the present controller, and the present parameter calibrating apparatus and method.

Figure 1:
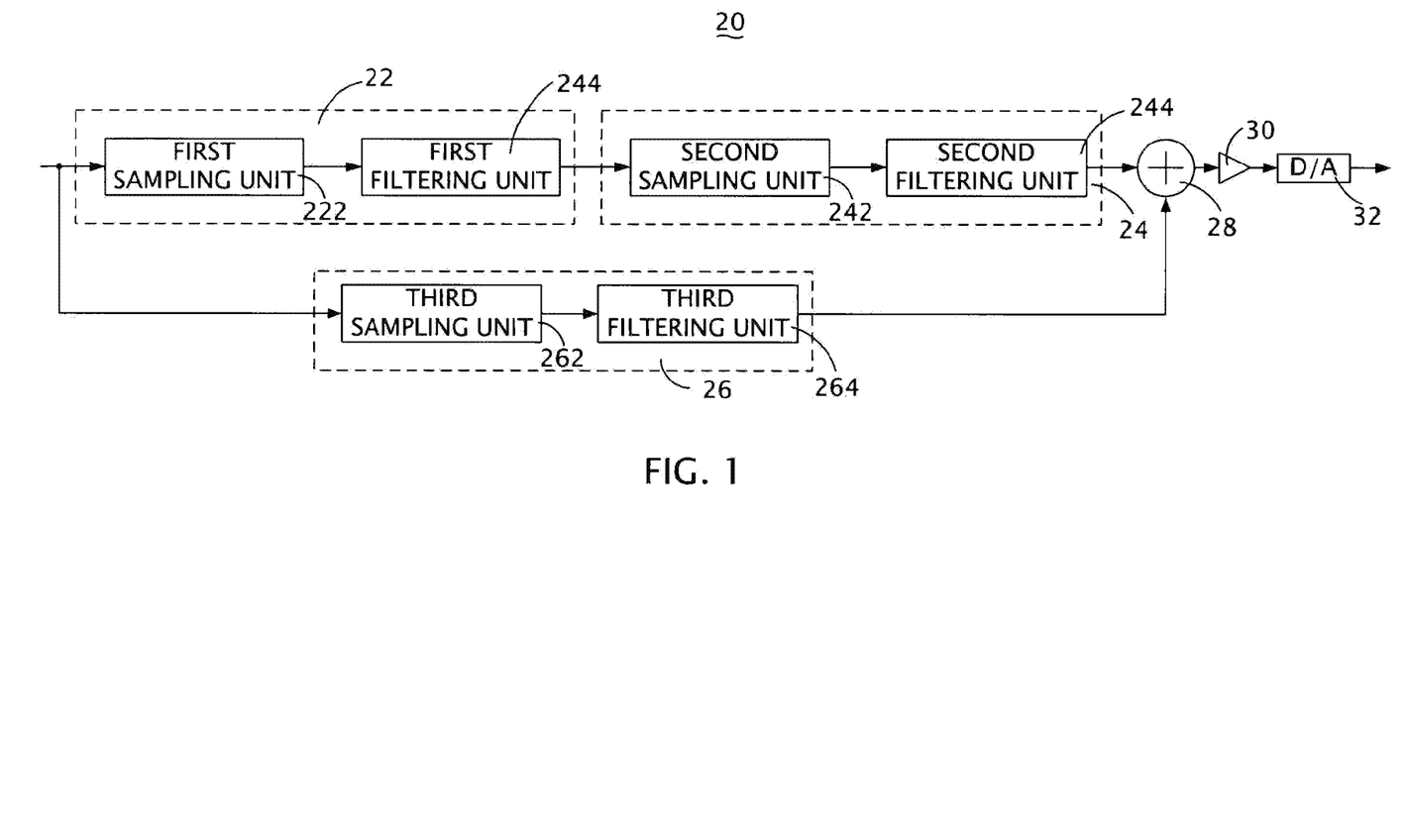
FIG. 1 is a block diagram of a controller for an optical disk device in accordance with an exemplary embodiment, the controller including a first sub-controller, a second sub-controller and a third sub-controller.

Referring to FIG. 1, a schematic view shows a controller 20 for an optical disk device in accordance with an exemplary embodiment. The controller 20 may be used for performing a tracking maintenance or a focusing maintenance of an optical disk device (not shown). The controller 20 includes a first sub-controller 22, a second sub-controller 24, and a third sub-controller 26. The first sub-controller 22 and the second sub-controller 24 are connected in series, and the combination thereof is connected in parallel with the third sub-controller 26. Generally, the sub-controllers 22, 24, 26 are used for sequentially processing different frequency components of an inputted signal, such as an electric signal from an optical pickup unit (not shown).

The first sub-controller 22 includes a first sampling unit 222 and a first filtering unit 224 serially connected to each other. The first sampling unit 222 receives and samples the inputted signal at a first sampling frequency, so as to convert the inputted signal into a first digital signal and send the first digital signal to the first filtering unit 224. The first filtering unit 224 generally filters the digital signal from the first sampling unit 222, and outputs a filtered signal to the second sub-controller 24. The second sub-controller 24 includes a second sampling unit 242 and a second filtering unit 244 electrically coupled to the second sampling unit 242. The third sub-controller 26 includes a third sampling unit 262 and a third filtering unit 264 electrically coupled to the third sampling unit 262. The sampling units 222, 242 and 262 have different sampling frequencies, thus processing different frequencies components of the inputted signal.

The controller 20 also includes an output adder 28, an output amplifier 30, and a digital-analog converter (DAC) 32. The output adder 28 is electrically coupled to the second and the third filtering units 244 and 264, for adding signals outputted from the second and the third sub-controllers 24 and 26. The output amplifier 30 is connected to the output adder 28 and the DAC 32, for receiving and amplifying a signal outputted from the output adder 28, and sending an amplified signal to the DAC 32. The DAC 32 converts the amplified signal from the output amplifier 30 into an analog signal. The analog signal can be fed back to a controlled plant, such as the optical pickup unit and the servo unit.

Figure 2:
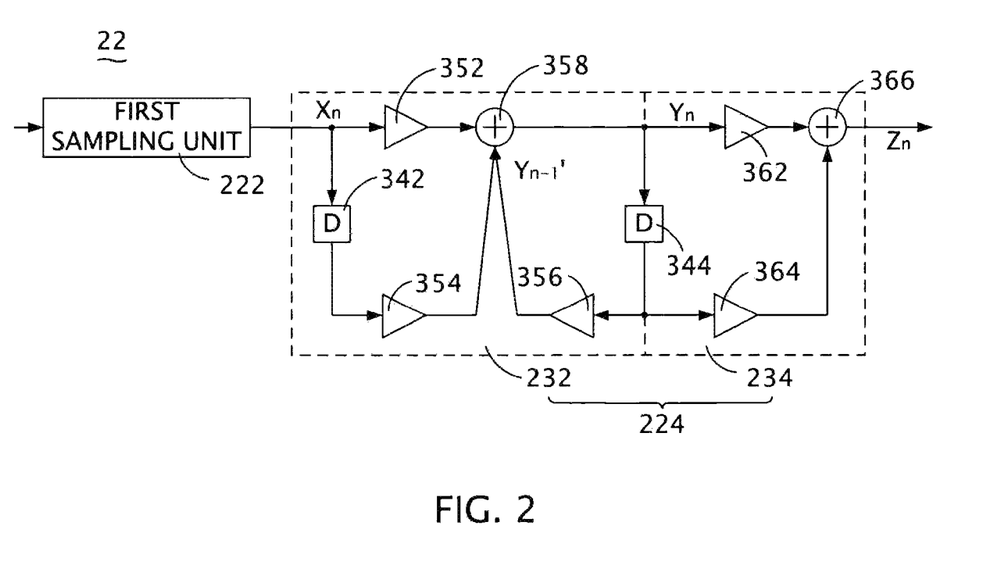
FIG. 2 is a schematic diagram showing the first sub-controller of the controller of FIG. 1.

Referring to FIG. 2, the first filtering unit 224 includes a first lead-lag filter 232 and a first low pass filter 234. The first lead-lag filter 232 includes two delayers (e.g. a lead-delayer 342 and a lag-delayer 344), three amplifiers (e.g. a fundamental-amplifier 352, a lead-amplifier 354, a lag-amplifier 356), and a lead-lag adder 358. The first lead-lag filter 232 thus may filter the inputted signal with a stable phase lock loop.

The fundamental-amplifier 352 is connected between the first sampling unit 222 and the lead-lag adder 358, for amplifying the digital signal $X_n$ and transmitting the amplified signal to the lead-lag adder 358 after a predetermined amplification process. The lead-delayer 342 is also coupled to the first sampling unit 222 for receiving and delaying the digital signal $X_n$ from the first sampling unit 222. The lead-amplifier 354 is electrically connected with the lead-delayer 342 and the lead-lag adder 358, for amplifying a lead-delayed signal transmitted from the lead-delayer 342, and sending a lead-amplified signal to the lead-lag adder 358. The lead-lag adder 358 receives the fundamental-amplified signal, the lead-amplified signal and a lad-amplified $Y_{n-1}'$ signal respectively from the fundamental amplifier 352, the lead-amplifier 354 and the lad-amplifier 356, thereby yielding a first lead-lag filtered signal $Y_n$ that is sent to the first low pass filter 234. The lag-delayer 344 is used for delaying a pre-output signal of the lead-lag filter 232, thereby yielding a lag-delayed signal that is sent to the lag-amplifier 356. Generally, the lag-delayer 344 is also co-used with the first low pass filter 234. The lag-amplifier 356 amplifies the lag-delayed signal from the lag-delayer 344, generating a lag-amplified signal $Y_{n-1}'$ which is to be sent to the lead-lag adder 358.

The first low pass filter 234 is used for passing low-frequency components in the first lead-lag filtered signal. The first low pass filter 234 includes a pre-amplifier 362, a delay-amplifier 364, a low-pass adder 366, and the common lag-delayer 344. The pre-amplifier 362 is connected with the lead-lag adder 358 and the low-pass adder 366, for receiving and amplifying the first lead-lag filtered signal $Y_n$, and sending the pre-amplified signal to the low-pass adder 366. The lag-delayer 344 is electrically coupled to the lead-lag adder 358 and the delay-amplifier 364, for delaying the first lead-lag filtered signal $Y_n$ and sending the lag-delayed signal to the delay-amplifier 364. The delay-amplifier 364 is used for amplifying the lag-delayed signal and sending the delay-amplified signal to the low-pass adder 366. The low-pass adder 366 outputs a first low-pass filtered signal $Z_n$ after adding the pre-amplified signal from the pre-amplifier 362 and the delay-amplified signal from the delay-amplifier 364. The first low-pass filtered signal $Z_n$ is a final output signal of the first sub-controller 22.

Figure 3:
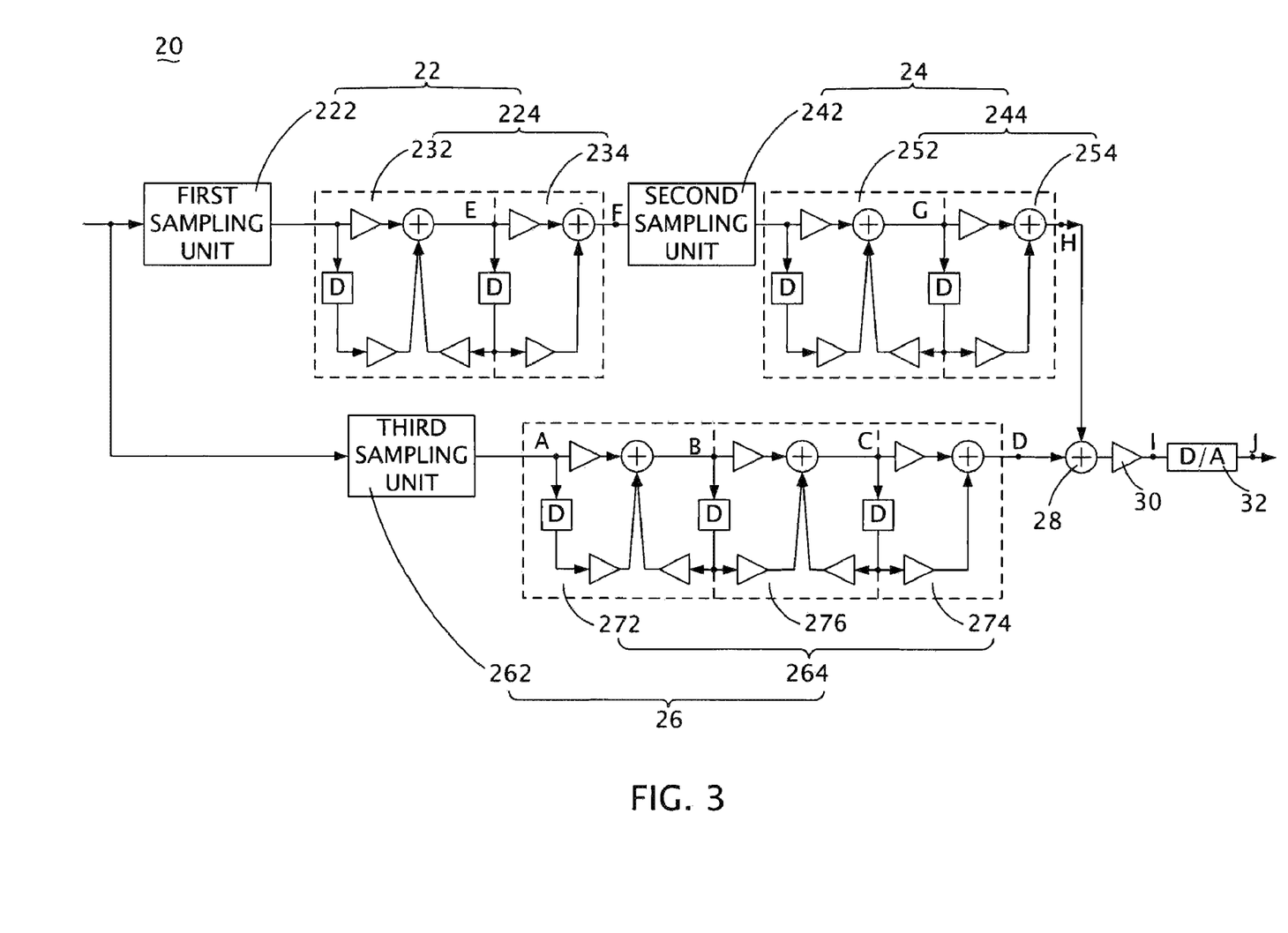
FIG. 3 is a schematic diagram showing the controller of FIG. 1.

Referring to FIG. 3, the second sub-controller 24 has a similar structure as the first sub-controller 22. The second sub-controller 24 includes a second sampling unit 242 with a second sampling frequency different from that of the first sampling unit 222, for re-sampling the outputted signal $Z_n$ from the first sub-controller 22 to generate a second digital signal. The second sub-controller 24 includes a second filtering unit 244 with a second lead-lag filter 252 and a second low pass filter 254 having similar structures as the first lead-lag filter 232 and the first low pass filter 234, respectively. Low frequency components of the inputted signal are sequentially filtered by the first and second sub-controllers 22 and 24.

The third sub-controller 26 has a third sampling unit 262 with a third sampling frequency from that of the first sampling unit 222 and the second sampling unit 242, for sampling the inputted signal at the third sampling frequency, so as to convert the inputted signal into a third digital signal and send the third digital signal to a third filtering unit 264. The third filtering unit 264 includes a third lead-lag filter, a third low pass filter 274 and an extra lead-lag filter 276. The extra lead-lag filter 276 is located between the third lead-lag filter 272 and the third low pass filter 274. Each of the third lead-lag filter 272 and the extra lead-lag filter 276 has a similar structure as the first lead-lag filter 232 and the second lead-lag filter 252, and the third low pass filter 274 has a similar structure as the first low pass filter 234 and the second low pass filter 254. High frequency components of the inputted signal are processable by the third sub-controller 26.

Figure 4:
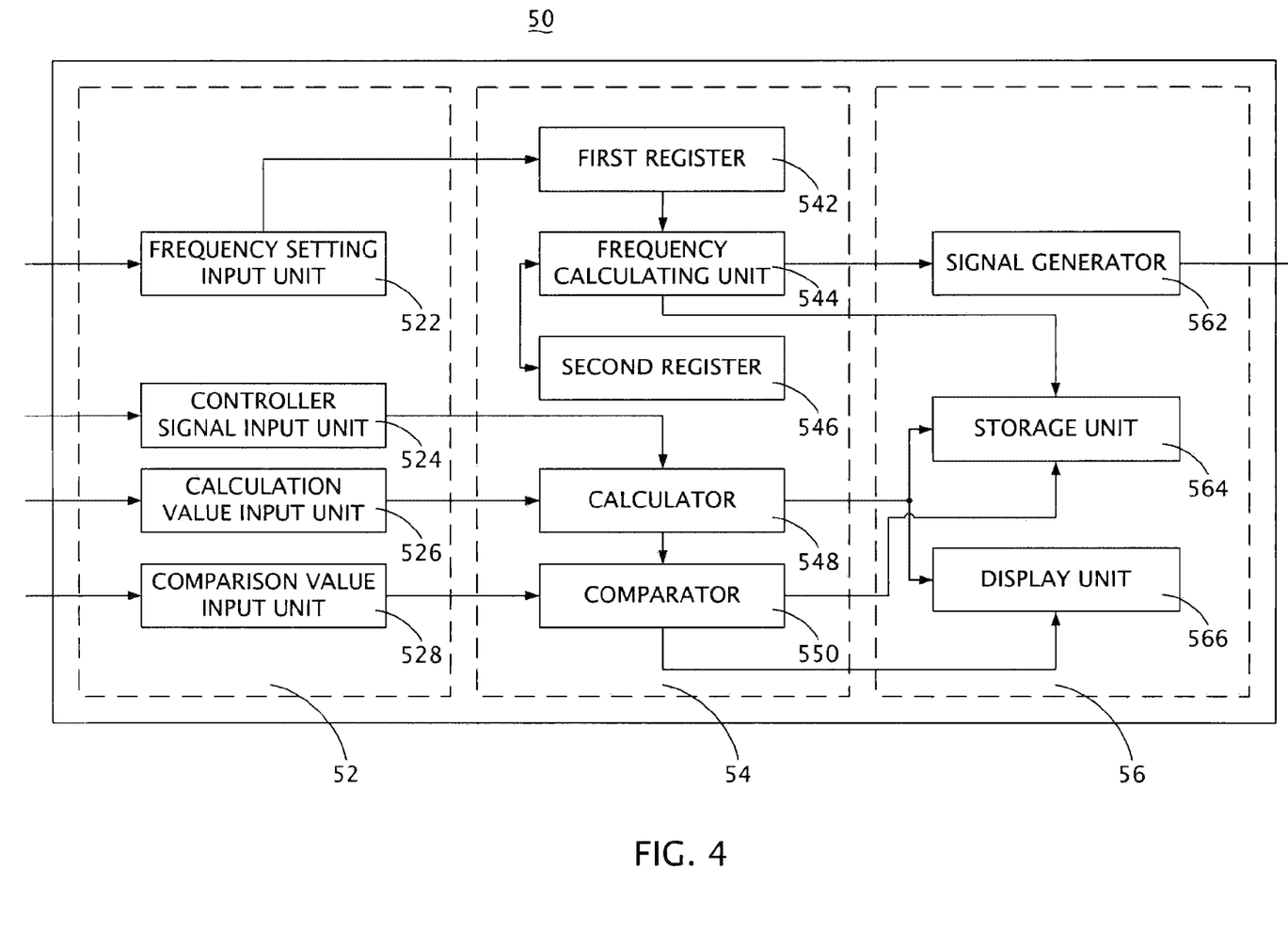
FIG. 4 is a block diagram of a parameter calibrating apparatus in accordance with an exemplary embodiment.

The controller 20 may perform differently when used with different controlled plants inputting quite different signals. Since the performance of the controller 20 has a greatly close relationship with the parameter settings thereof, the parameters of the controller 20 should be adjusted for different controlled plants. When calibrating parameters of the controller 20, a plurality of detecting nodes (such as node A to J as shown in FIG. 3) is defined in the controller 20. Referring to FIG. 4, a parameter calibrating apparatus 50 may be used for evaluating a performance of the controller 20. The parameter calibrating apparatus 50 monitors and analyzes monitoring signals from the nodes when a plurality of testing signals with various frequencies are applied to the controller 20. The parameter settings of the controller 20 thus may be calibrated based on an evaluation result of the parameter calibrating apparatus 50.

Relationship between the defined nodes and the monitoring signals thereof are listed in a following table as examples:

| Nodes | Signals |
| --- | --- |
| A | Output signal from the third sampling unit 262. |
| B | Output signal from the third lead-lag filter 272. |
| C | Output signal from the extra lead-lag filter 276. |
| D | Output signal from the third sub-controller 26. |
| E | Output signal from the first lead-lag filter 232. |
| F | Output signal from the first sub-controller 22. |
| G | Output signal from the second lead-lag filter 352. |
| H | Output signal from the second sub-controller 24. |
| I | Output signal from the output amplifier 30. |
| J | Output signal from the DAC 32. |

Based on the monitoring signals, main intermediate processes in the controller 20 can be monitored.

The parameter calibrating apparatus 50 includes an input module 52 for inputting users settings and monitoring signals, a processing module 54 for generating testing signals to the controller 20 and calculating evaluation results based on the monitoring signals and an output module 56 for outputting the generated testing signals to the controller 20 and displaying or storing the evaluation results.

The input module 52 includes a frequency setting input unit 522, a controller signal input unit 524, a calculation value input unit 526 and a comparison value input unit 528.

The frequency setting input unit 522 is used for inputting testing signal settings, such as a frequency range and a frequency interval of the testing signals, and sending the testing signal settings to the processing module 54.

The controller signal input unit 524 is connected with the controller 20 and the processing module 54, for receiving the monitoring signals from the controller 20 and sending the monitoring signals to the processing module 54.

The calculation value input unit 526 is used for receiving predetermined gain saturation values corresponding to the nodes and transmitting the gain saturation values to the processing module 54 for calculation. The processing module 54 generates a gain result based on the monitoring signals and the corresponding gain saturation values.

The comparison value input unit 528 is used for inputting predetermined threshold values and sending the threshold values to the processing module 54, for providing comparing references.

The processing module 54 includes a first register 542, a frequency calculating unit 544, a second register 546, a calculator 548 and a comparator 550. The first register 542 is coupled to the frequency setting input unit 522 for receiving and registering the testing signal settings. The frequency calculating unit 544 is connected to the first register 542, for reading the testing signal settings and calculating a quantity for different frequencies of the testing signals according to the testing signal settings. The second register 546 is connected to the frequency calculating unit 544 for storing the quantity of the frequencies. The frequency calculating unit 544 also calculates a current frequency based on the testing signal settings stored in the first register 542 and the quantity of the frequencies stored in the second register 546, for driving the output module 56 to send a testing signal to the controller 20 or being stored. After a calculation of the current frequency is completed, the current frequency is sent to the output module 56, the frequency calculating unit 544 decreases the quantity of frequencies by one, and sends the decreased number of frequencies to the second register 546.

The calculator 548 is adapted in connection with the controller signal input unit 524 for receiving the monitoring signals and the calculation value input unit 526 for receiving the gain saturation values. The calculator 548 calculates to obtain gain results based on the monitoring signals and the gain saturation values. Generally, the gain results may be obtained by an equation $$G_s = 20 \times \log_{10} \frac{V_{pp}}{V_t}.$$

Wherein, $G_s$ stands for the gain result, $V_{pp}$ stands for the value of the monitoring signals, and $V_t$ stands for the gain saturation values corresponding to the nodes. After calculating the gain results for the monitoring signals, the calculator 548 sends the gain results to the comparator 550 for comparison and to the output module 56 for storage or display.

The comparator 550 compares the gain results from the calculator 548 with the threshold values from the comparison value input unit 582, and generates a comparison result to be sent to the output module 56, for storage or display.

The output module 56 includes a signal generator 562, a storage unit 564 and a display unit 566. The signal generator 562 is connected to the frequency calculating unit 544, for generating testing signals based on the calculated current frequency therefrom. The testing signals are sent to the controller 20, for testing the performance of the controller 20. The storage unit 564 is configured for storing the current frequency, the gain result, and the comparison result.

Figure 5:
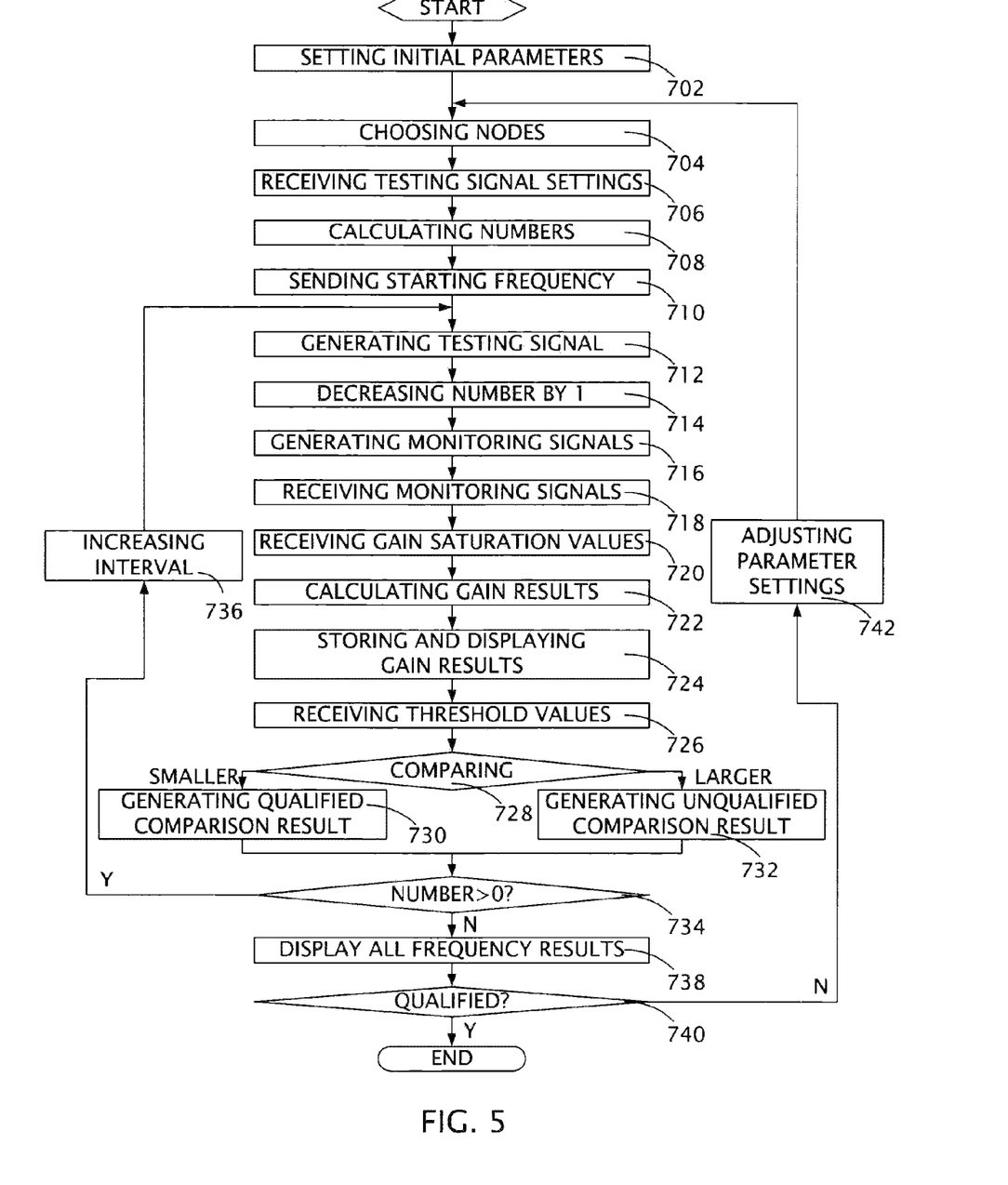
FIG. 5 is a flow chart of a parameter calibrating method in accordance with an exemplary embodiment.

Referring to FIG. 5, a parameter calibrating method of the parameter calibrating apparatus 50 in accordance with an exemplary embodiment is illustrated. Firstly, in step 702, setting initial parameters for the controller 20 is performed.

Secondly, predetermined nodes in the controller 20 are defined (step 704).

Thirdly, the frequency setting input unit 522 receives settings of testing signals, and sends the testing signal settings to the first register 542 (step 706). The testing signal settings include a frequency range, such as $f_l<f<f_h$, and a frequency interval $f_i$ of the testing signals. Wherein, $f_h$ stands for the higher limit frequency in the frequency range, $f_l$ refers to the lower limit in the frequency range.

In step 708, the frequency calculating unit 544 calculates a quantity for different frequencies of the testing signals, and stores the quantity for the frequencies in the second register 546. The quantity for the frequencies may be calculated by an equation $$N = \frac{f_h - f_l}{f_i} + 1.$$

Wherein, N refers to the quantity for the different frequencies, and $f_i$ stands for the frequency interval.

Step 710, the frequency calculating unit 544 sends a starting frequency, such as a lower limit $f_l$, to the signal generator 562.

Step 712, the signal generator 562 generates a testing signal with a frequency determined by the frequency calculating unit 544, and sends the testing signal to the controller 20.

Step 714, the frequency calculating unit 544 decreases the number of the testing signals' frequencies by one, and restores the decreased number to the second register 546.

Step 716, the controller 20 processes the testing signal and generates monitoring signals in the nodes.

Step 718, the controller signal input unit 524 receives the monitoring signals, and transmits the monitoring signals to the calculator 548 for calculating.

Step 720, the calculation value input unit 526 receives the gain saturation values, and transmits the gain saturation values to the calculator 548 for calculation.

The calculator 548 calculates to obtain gain results based on the monitoring signals and the gain saturation values, according to the above described equation $$G_s = 20 \times \log_{10} \frac{V_{pp}}{V_t},$$

and sends the gain results to the storage unit 564, the display unit 566, and the comparator 550 (step 722). Wherein, $G_s$ stands for the gain result, $V_{pp}$ stands for the value of the monitoring signals, and $V_t$ stands for the gain saturation values corresponding to the nodes.

Step 724, the gain results are stored in the storage unit 564; and are displayed to users by the display unit 566.

Step 726, the comparison value input unit 528 receives the threshold values, and transmits the threshold values to the comparator 550.

Step 728, the comparator 550 compares the gain results with the threshold values, judging whether the gain results are smaller than the threshold values correspondingly.

Figure 6:
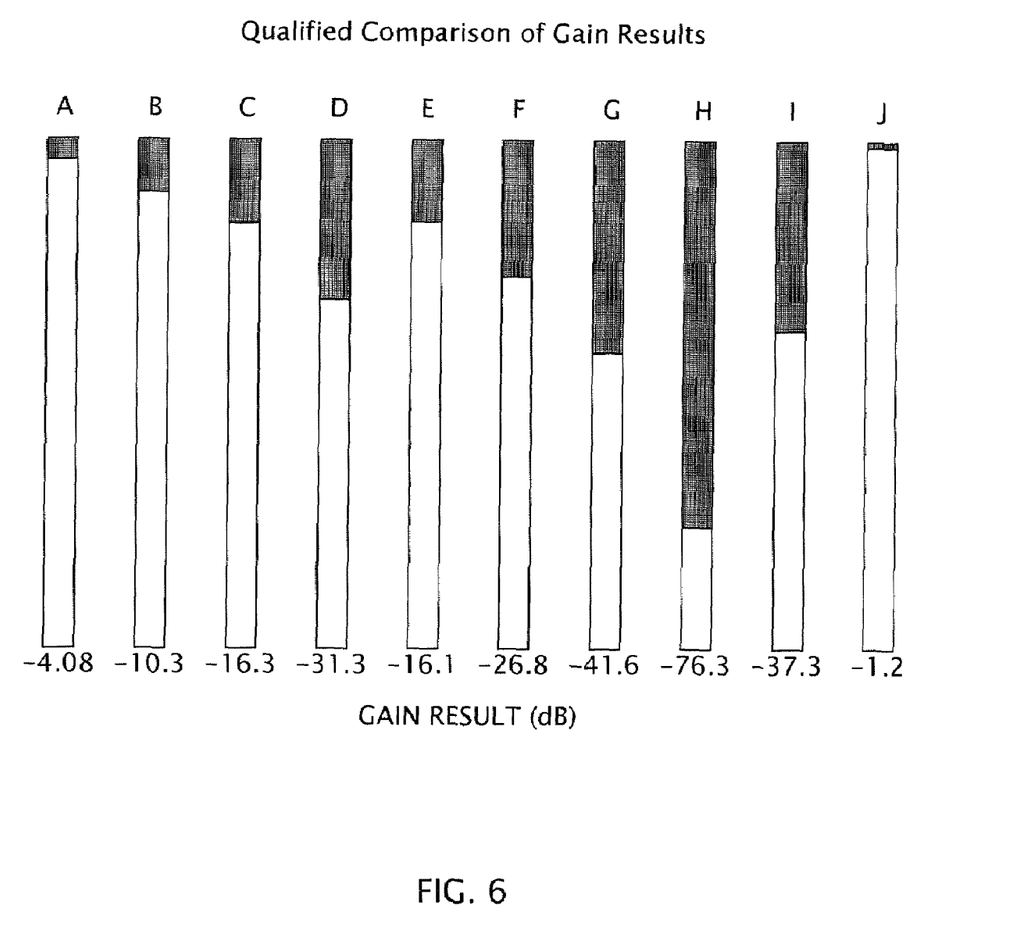
FIG. 6 is a schematic diagram showing an example of a qualified comparison result.

If all the gain results are all smaller than the threshold values, a qualified comparison result indicating all monitored signals are qualified is generated by the comparator 550. Referring also to FIG. 6, a first chart (not labeled) illustrates an example of a qualified comparison result. In the first chart, the nodes A to J and the gain results, such as −4.08, −10.3, −16.3 etc., are all smaller than the threshold value, e.g. zero, are correspondingly marked at a top side and a bottom side of a corresponding bar. A same shade shows a difference between the gain values and corresponding thresholds in each bar. Therefore, it can be inferred from the first chart that all the gain results from all the nodes are smaller than the threshold values. Thus, the qualified comparison result is sent to the storage unit 564 and the display unit 566 (step 730).

If only some of the gain results are smaller than the threshold values, an unqualified comparison result will be generated by the comparator 550 and sent to the storage unit 564 and the display unit 566 (step 732). The unqualified comparison result may correspondingly include unqualified nodes, the monitoring signals, the gain results, and the frequency of the testing signal, etc.

Figure 7:
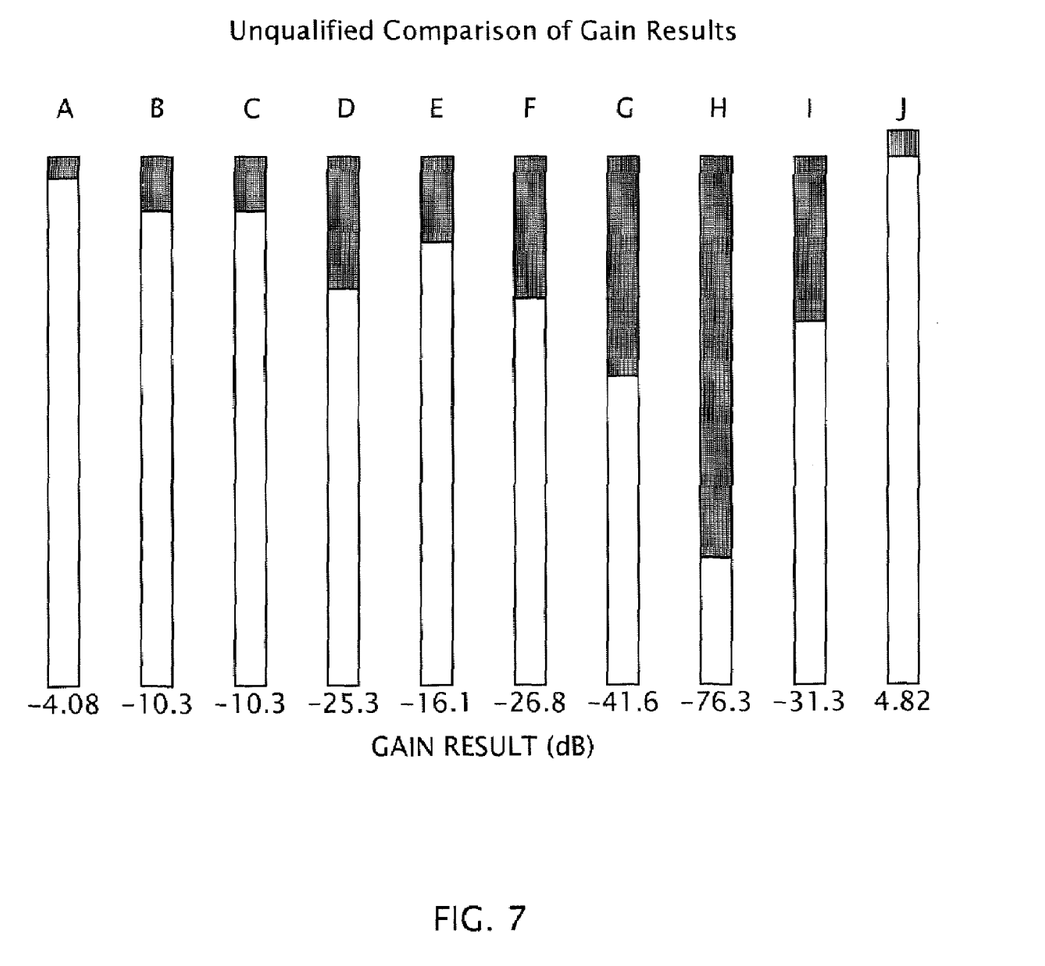
FIG. 7 is a schematic diagram showing an example of an unqualified comparison result.

Referring also to FIG. 7, a second chart (not labeled) illustrates an example of the unqualified comparison result. In the second chart, the nodes A to J and the gain results, correspondingly showing most of the gains, such as −4.08, −10.3, −10.3, . . . , −31.3, are smaller than the predetermined threshold, e.g. zero, except for one of the gains 4.82 is larger than a predetermined threshold, e.g. zero, are marked at a top side and bottom of the bar correspondingly. Two different shades showing each depicting a larger difference and a smaller difference between the gain results and threshold values are shown in the bars. Therefore, it can be inferred from the second chart that the gain result of the node J is larger than the threshold value while the gain results of the nodes A to I are smaller than the threshold values.

If all the gain results are all smaller than the threshold values correspondingly, a qualified comparison result is generated indicating that all monitoring signals are qualified. The qualified comparison result is then sent to the storage unit 564 and the display unit 566 (step 732).

Figure 8:
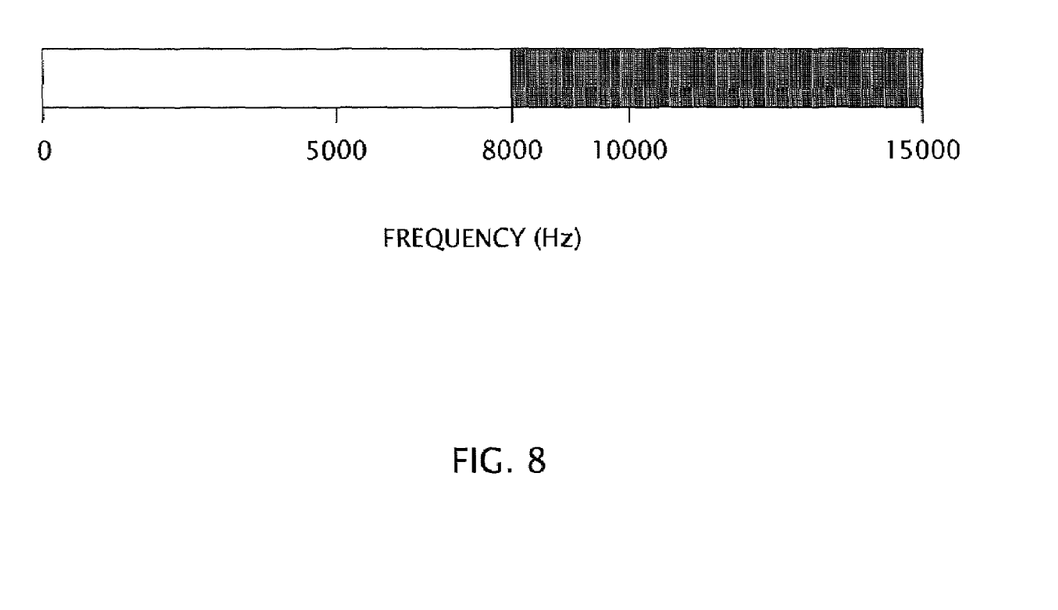
FIG. 8 is a schematic diagram showing partial-unqualified frequencies.

Referring also to FIG. 8, a totally-qualified comparison result is illustrated. It can also be inferred from the bars that all the gain results from all the nodes are smaller than the threshold values.

In step 734, the frequency calculating unit 544 judges whether the quantity for the frequencies of the testing signals stored in the second register 546 is larger than zero.

Step 736, if the number stored in the second register 546 is larger than zero, the frequency calculating unit 544 increases the testing signal's frequency by the frequency interval, and sends the increased frequency to the signal generator 562. Then, step 712 as described above will be executed.

If the number stored in the second register 546 is zero, a figure showing whether the comparison results within the whole frequency range of the testing signal are qualified will be displayed by the display unit 566 (step 738).

Figure 9:
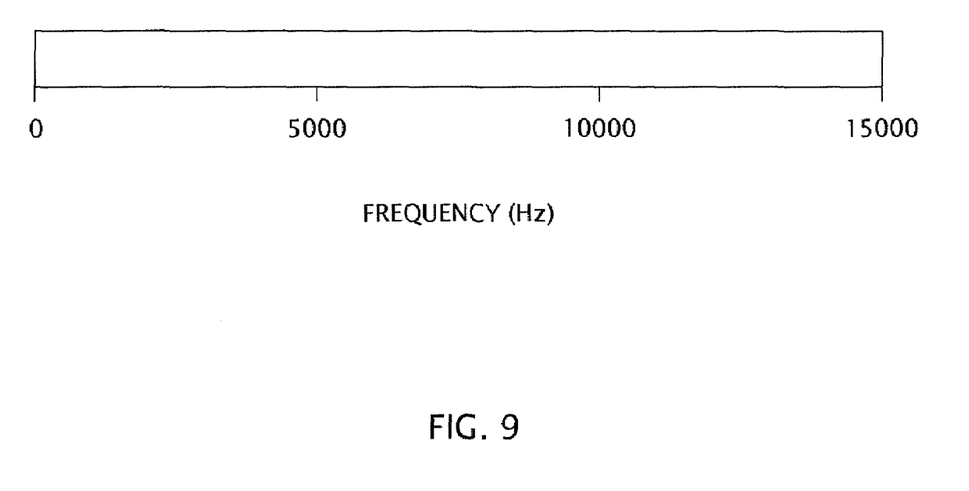
FIG. 9 is a schematic showing totally-qualified frequencies.

Referring now to FIG. 8 and FIG. 9, two examples of the figures displayed in step 738 depicting an all-qualified situation and a partially-unqualified situation are illustrated respectively. In FIG. 8, it is shown that frequencies ranges higher than 8000 Hz are highlighted, showing the gain results are unqualified when the testing signals with frequencies higher than 8000 Hz are inputted to the controller 20. Thus, it is indicated that the performance of the controller 20 is reliable only when the controller processes signals with a frequency less than 8000 Hz. By contrary, in FIG. 9, it can be seen that the whole frequency range from 0 to 15000 Hz is not highlighted, indicating that the performance of the controller is reliable to a wide input signal frequency range of 0~15000 Hz.

Next, in step 740, it is detected whether the reliable frequency range is qualified.

If it is concluded in step 740 that the reliable frequency range is qualified, the parameter calibrating method comes to an end.

If it is concluded in step 740 that the reliable frequency range is unqualified, the parameter setting of the controller 20 is adjusted (step 742). Then, step 704 and the following steps will be executed for another cycle for testing, calculating, and comparing.

The performance of the controller 20 with preset parameters is evaluated by calculating gain results of the monitoring signals from the intermediate nodes A to J during signal processing in the controller 20. Thus, when one of the gain results for one node becomes unqualified, the parameter of the intermediate processing unit near the unqualified node can be adjusted, the parameters of the controller 20 can be calibrated with quite pertinence and accuracy.

The foregoing description of the exemplary embodiments of the invention has been presented only for the purposes of illustration and description and is not intended to be exhaustive or to limit the invention to the precise forms disclosed. Many modifications and variations are possible in light of the above teaching. The embodiments were chosen and described in order to explain the principles of the invention and their practical application so as to enable others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the exemplary embodiments described therein.

What is claimed is:

1. A parameter calibrating method for a controller comprising steps of:
    setting initial parameter settings for the controller;
    choosing nodes from the controller;
    receiving testing signal settings for a testing signal;
    generating the testing signal according to the testing signal settings and sending the testing signal to the controller;
    receiving monitoring signals from the nodes of the controller;
    calculating gain results according to the monitoring signals;
    comparing the gain results with a predetermined threshold value and generating comparison results;
    judging whether the parameter settings for the controller are qualified according to the comparison results; and
    adjusting the parameter settings for the controller if the parameter settings are unqualified.

2. The parameter calibrating method as claimed in claim 1, further comprising steps of:
    receiving gain saturation values; and
    calculating the gain results according to the monitoring signals and the gain saturation values.

3. The parameter calibrating method as claimed in claim 1, further comprising step of:
    receiving the threshold value.

4. The parameter calibrating method as claimed in claim 3, further comprising steps of:
    generating a qualified comparison result if the gain results are smaller than the threshold value; and
    generating an unqualified comparison result if any of the gain results is larger than the threshold value.

5. The parameter calibrating method as claimed in claim 1, further comprising steps of:
    receiving a higher limit frequency, a lower limit frequency and a frequency interval;
    calculating a number of the testing signals' frequencies;
    storing the number;
    generating a testing signal with the lower limit frequency; and
    decreasing the stored number by one.

6. The parameter calibrating method as claimed in claim 5, further comprising steps of:
    judging whether the stored number is larger than zero;
    calculating a new generating frequency by adding a frequency interval to a previous generating frequency if the stored number is larger than zero; and
    decreasing the stored number by one.

7. The parameter calibrating method as claimed in claim 5, further comprising steps of:
    displaying a figure showing whether the results of the comparison are qualified towards all the testing signals if the stored number is zero.

8. The parameter calibrating method as claimed in claim 1, further comprising steps of:
    calculating a generating frequency of the testing signal according to the testing signal settings; and
    generating the testing signal with the generating frequency, and sending the testing signal to the controller.

9. The parameter calibrating method as claimed in claim 8, further comprising steps of:
    if the testing signal with the generating frequency is calculated, calculating a new generating frequency of the testing signal according to the testing signal settings; and
    generating the testing signal with the new generating frequency and sending the testing signal to the controller.

10. The parameter calibrating method as claimed in claim 9, further comprising steps of:
    calculating a number of the generating frequencies of the testing signal according to the testing signal settings;
    storing the number of the frequencies of the testing signal; and
    if the testing signal with a current generating frequency is calculated, decreasing the number of the frequencies of the testing signal by one;
    judging whether the decreased number is larger than zero; and
    calculating a new generating frequency by adding a frequency interval of the testing signal settings to a previous generating frequency if the decreased number is larger than zero.

11. The parameter calibrating method as claimed in claim 10, further comprising step of: displaying a figure showing whether the comparison results of the testing signal are qualified if the decreased number is zero.

12. A parameter calibrating apparatus for a controller, the parameter calibrating apparatus comprising:
    a frequency setting input unit for inputting testing signal settings for a testing signal;
    a frequency calculating unit for calculating a generating frequency of the testing signal according to the testing signal settings;
    a signal generator for generating the testing signal with the generating frequency, and sending the testing signal to the controller;

a controller signal input unit for receiving monitoring signals from defined nodes of the controller;

a calculator for calculating gain results based on the monitoring signals received from the defined nodes of the controller; and a comparator for comparing the gain results with a predetermined threshold value and for generating comparison results for indicating performance of the controller.

13. The parameter calibrating apparatus as claimed in claim 12, further comprising a calculation value input unit for inputting gain saturation values, the calculator calculates the gain results based on the monitoring signals and the gain saturation values.

14. The parameter calibrating apparatus as claimed in claim 12, wherein further comprising a comparison value input unit for inputting the predetermined threshold value.

15. The parameter calibrating apparatus as claimed in claim 12, further comprising:

a first register connected to the frequency setting input unit for storing the testing signal settings; and a second register connected to the frequency calculating unit for storing the generating frequencies of the testing signal.

16. The parameter calibrating apparatus as claimed in claim 15, wherein if the testing signal with the frequency is calculated, the frequency calculating unit calculates a next generating frequency of the testing signal according to the testing signal settings, the signal generator generates the testing signal with the next generating frequency and sends the testing signal to the controller.

17. The parameter calibrating apparatus as claimed in claim 15, further comprising:

a storage unit connected to the frequency calculating unit, the calculator and the comparator for storing the frequency of the test signal, the gain results, and the comparison results; and display unit connected to the calculator and the comparator, the display unit being configured for displaying the gain results and the comparison results.

* * * * *